(12) United States Patent
Rose et al.

(10) Patent No.: US 9,481,064 B2
(45) Date of Patent: Nov. 1, 2016

(54) MULTI-TOOL ADAPTOR

(71) Applicant: Wilson Tool International Inc., White Bear Lake, MN (US)

(72) Inventors: Christopher J. Rose, Swindon (GB); Damian O'Brien-Jones, Swindon (GB)

(73) Assignee: Wilson Tool International Inc., White Bear Lake, MN (US)

( * ) Notice: Subject to any disclaimer, the term of this patent is extended or adjusted under 35 U.S.C. 154(b) by 369 days.

(21) Appl. No.: 14/187,307

(22) Filed: Feb. 23, 2014

(65) Prior Publication Data

US 2015/0239084 A1 Aug. 27, 2015

(51) Int. Cl.
*B21D 28/12* (2006.01)
*B23Q 3/18* (2006.01)
*B21D 28/36* (2006.01)
*B21D 45/00* (2006.01)

(52) U.S. Cl.
CPC ............... *B23Q 3/18* (2013.01); *B21D 28/12* (2013.01); *B21D 28/36* (2013.01); *B21D 45/006* (2013.01); *Y10T 483/10* (2015.01); *Y10T 483/15* (2015.01)

(58) Field of Classification Search
CPC .. B21D 28/12; B21D 28/125; B21D 45/003; B21D 45/006; B21D 45/06; B23Q 3/18; B23Q 2003/15586; Y10T 483/15
See application file for complete search history.

(56) References Cited

U.S. PATENT DOCUMENTS

| | | | | |
|---|---|---|---|---|
| 4,555,966 A * | 12/1985 | Klingel | ................. | B21D 28/34 234/113 |
| 5,176,057 A * | 1/1993 | Chun | ................. | B21D 45/006 83/139 |
| 5,382,102 A * | 1/1995 | Brolund | ................. | B21D 28/12 101/3.1 |
| 5,848,563 A | 12/1998 | Saito | | |
| 5,934,165 A | 8/1999 | Chatham | | |
| 7,032,812 B2 * | 4/2006 | Ostini | ................. | B21D 28/12 234/43 |
| 8,413,561 B2 * | 4/2013 | Thielges | ............. | B21D 28/005 29/39 |
| 8,511,128 B2 * | 8/2013 | Boepple | ................ | B21D 28/12 72/326 |
| 2011/0107888 A1 | 5/2011 | Thielges et al. | | |

FOREIGN PATENT DOCUMENTS

EP 2196270 A1 6/2010

OTHER PUBLICATIONS

International Search Report and the Written Opinion of corresponding Intl. Pat. App. No. PCT/US2015/016525, mailed May 21, 2015, 9 pages, European Patent Office, Rijswijk, The Netherlands.

* cited by examiner

*Primary Examiner* — Edward Tolan
(74) *Attorney, Agent, or Firm* — Fredrikson & Byron, P.A.

(57) ABSTRACT

A multi-tool adaptor which enhances overall performance of the multi-tools on which the adaptor is intended and the punch presses with which the multi-tools are desired to interface. The intermediary components relating to the functioning of the multi-tool involve one area of consideration regarding the adaptor design. Another area of consideration for the adaptor design involves the manner by which the stripper plate is operably coupled to the punch holder.

20 Claims, 10 Drawing Sheets

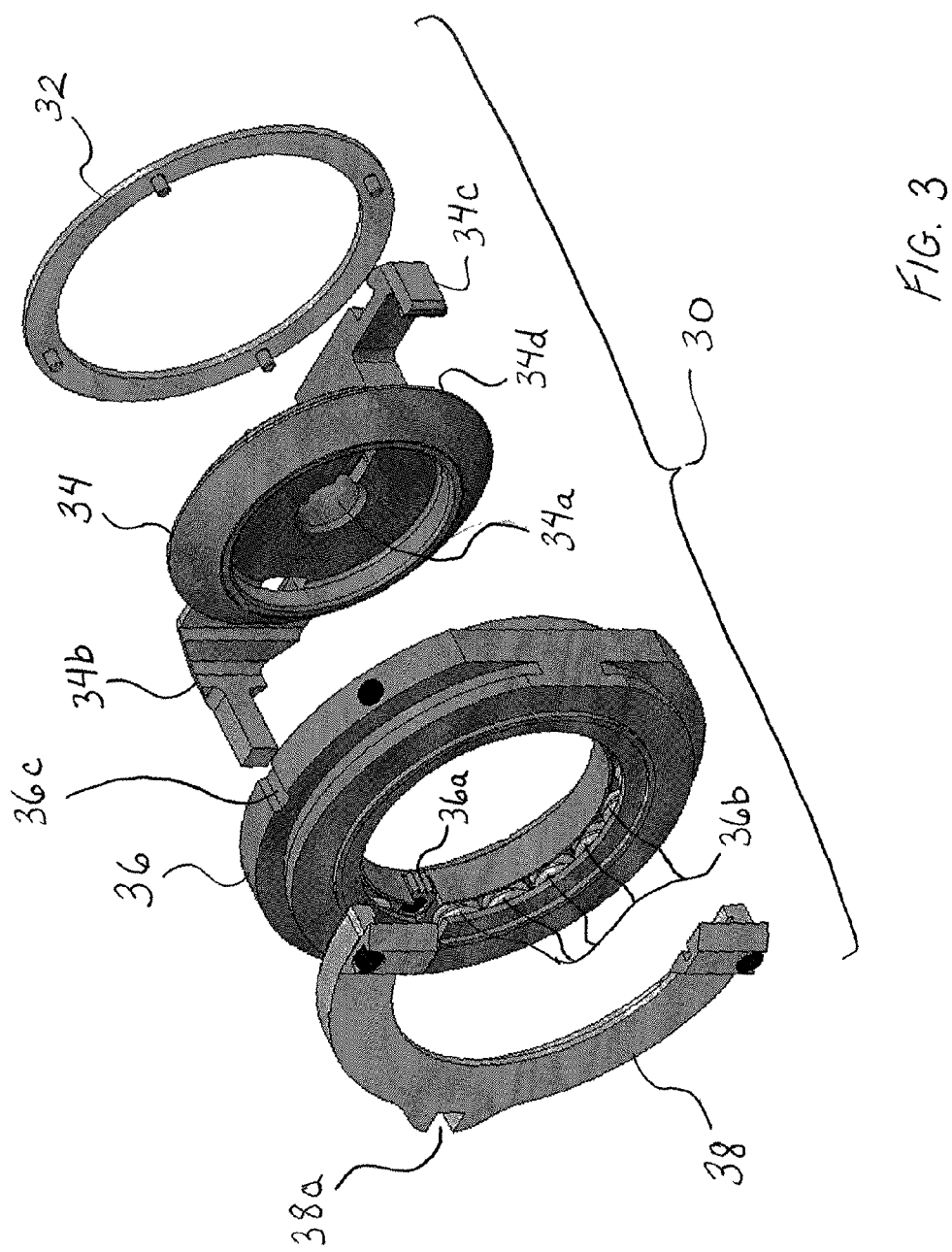

MULTI-TOOL ADAPTOR

FIELD OF INVENTION

The present invention relates generally to tooling used with fabrication equipment or machines. More particularly, this invention relates to multi-tools and an adaptor configured therefor so the multi-tools are made compatible with one or more designs of fabrication equipment or machines.

BACKGROUND

Sheet metal and other workpieces can be formed into a wide range of useful products. Fabrication equipment or machines are often used for such processes. For example, in the case of punch presses, the press is typically configured to hold a plurality of tools for forming a variety of shapes and sizes of indentations and/or holes in the sheet metal and workpieces. Tools of this sort commonly include at least one punch assembly and corresponding die.

A conventional punch assembly typically includes a punch guide, a punch holder, and a punch. When the punch assembly is mounted in a punch press, and located in a working position of the press, i.e., beneath a ram (or integrally connected to the ram) and vertically aligned with a corresponding die, the punch and holder can be driven out from the punch guide, through an opening in a stripper plate, in order to form an indentation or a hole through a sheet workpiece with the tip of the punch. The stripper plate, which is attached to an end of the punch guide, prevents the workpiece from following the punch, upon its retraction back into the punch guide.

In contrast to the above-described conventional designs of punch assemblies, many presses have been designed to function with multi-tools. As is known, a multi-tool has a plurality of tool-receipt openings adapted to receive respective tools. Thus, as opposed to only a single tool being available at a single tool-mount location of a punch press, a multi-tool allows any of the differing tools (e.g., punches) it carries to be available. As such, configuring a press to accommodate a multi-tool enables the press to have enhanced versatility with regard to deformation and/or punching processes.

One type of punch press designed to accommodate multi-tools is the multiple-station turret press; however, a variety of other presses are further known to have been configured for multi-tools, such as single-station presses or other presses not having turrets. Punch press manufacturers (of which there are many) routinely design their machines so as to normally accommodate and function with tools of their own design and specification. However, it is often the case that purchasers of these presses are interested in using tooling, including multi-tools, of other manufacturers. As such, adaptors have been designed for such purpose, i.e., to interface the alternate tooling (of one manufacturer) with the press machine (of other manufacturer).

To date, adaptors have been commercialized to enable interfacing between multi-tools and particular punch presses. However, in many cases, the overall functioning of the multi-tools and/or punch presses has been limited based on the design of the adaptors. Embodiments of the invention focus on a multi-tool adaptor which enhances overall performance of the multi-tools on which the adaptor is intended and the punch presses with which the multi-tools are desired to interface.

SUMMARY OF INVENTION

In certain embodiments, the invention provides an adaptor for a multi-tool. The adaptor comprises a tool shank holder configured to be operably coupled to a tool shank of a multi-tool, and a locking ring configured to engage a tool selection wheel of the multi-tool. The locking ring is configured to be operably coupled yet rotatable relative to the tool shank holder, whereby the locking ring extends from the tool shank holder and is defined with a plurality of slots. The adaptor further comprises an index ring configured to be operably joined to the locking ring via a plurality of cam keys. The cam keys are rigidly held to the index ring and extend inward from a periphery of the index ring so as to correspondingly align with the slots of the locking ring, wherein when at least one of the cam keys is inserted within one of the slots of the locking ring, the locking ring is rotationally coupled to the index ring, while the tool shank holder and locking ring are free to move vertically relative to the index ring.

In additional embodiments, the invention provides a multi-tool with adaptor, comprising a multi-tool that comprises a tool shank, a tool selection wheel, and a tool holder including a plurality of tools. The tool shank is operably coupled to the tool holder, and the tool selection wheel is held between the tool shank and the tool holder, wherein the tool selection wheel has a central opening into which a segment protrudes from a periphery of the wheel. The multi-tool with adaptor further comprises an adaptor that comprises a tool shank holder, a locking ring, and an index ring. The tool shank holder is operably coupled to the tool shank and the locking ring, yet the locking ring is rotatable relative to the tool shank holder. The locking ring extends from the tool shank holder and is engaged with the tool selection wheel such that the wheel is rotationally coupled to the locking ring. The locking ring further defines a plurality of slots therein. The index ring is operably joined to the locking ring via a plurality of cam keys. The cam keys are rigidly held to the index ring and extend inward from a periphery of the index ring so as to correspondingly align with the slots of the locking ring. At least one of the cam keys is inserted within one of the slots of the locking ring at all times so as to rotationally couple the locking ring to the index ring, while the tool shank holder and locking ring are free to move vertically relative to the index ring.

In further embodiments, the invention provides a method of using a multi-tool with adaptor with fabrication equipment, wherein the multi-tool comprises a tool shank, a tool selection wheel, a tool holder including a plurality of tools, and a stripper plate defined with a plurality of apertures corresponding to a quantity of tool-receipt areas of the tool holder. The tool shank is operably coupled to the tool holder, and the tool selection wheel is held between the tool shank and the tool holder, wherein the tool selection wheel has a central opening into which a segment protrudes from a periphery of the wheel. The adaptor comprises a tool shank holder, a locking ring, an index ring, and a stripper plate holder. The tool shank holder is operably coupled to the tool shank and the locking ring, yet the locking ring is rotatable relative to the tool shank holder. The locking ring extends from the tool shank holder and is engaged with the tool selection wheel such that the wheel is rotationally coupled to the locking ring. The locking ring further defines a plurality of slots therein. The index ring is operably joined to the locking ring via a plurality of cam keys. The cam keys are rigidly held to the index ring and extend inward from a periphery of the index ring so as to correspondingly align with the slots of the locking ring. At least one of the cam keys is inserted within one of the slots of the locking ring at all times so as to rotationally couple the locking ring to the index ring, while the tool shank holder and locking ring are free to move vertically relative to the index ring. The stripper plate holder is operably coupled to the tool shank holder, and is oriented to align the apertures of the stripper plate with the quantity of tool-receipt areas of the tool holder. The method of using the multi-tool with adaptor with fabrication equipment comprises the steps of locking position of the index ring via first mechanism of the fabrication equipment, thereby locking position of the tool selection wheel; rotating the tool shank holder via second mechanism of the fabrication equipment, thereby rotating the plurality of tools about the tool selection wheel until a desired tool is aligned with the segment of the tool selection wheel; and applying force on the tool shank via third mechanism of the fabrication equipment, such that desired tool is vertically extended through corresponding aperture of the stripper plate. The operable coupling of the stripper plate and the tool shank holder being provided internal to the multi-tool enables the rotation of the tool shank holder to be at least 360 degrees while positioning of the first mechanism can be maintained with respect to the multi-tool.

BRIEF DESCRIPTION OF DRAWINGS

FIG. 3 is an exploded view of components of an adaptor for the multi-tool assembly of FIG. 2.

DETAILED DESCRIPTION

Figure 1:
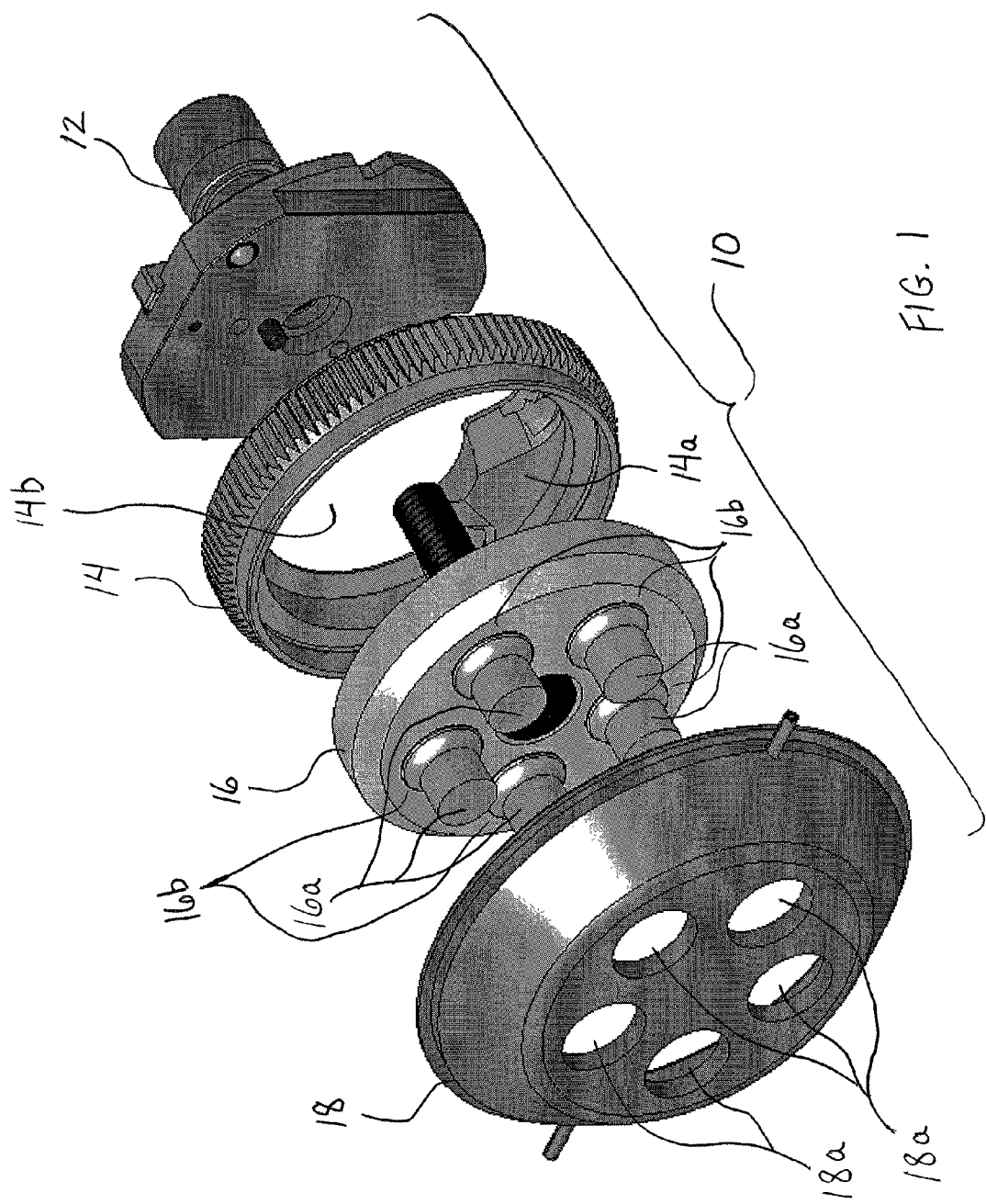
FIG. 1 is an exploded view of components of an exemplary multi-tool.

The following detailed description should be read with reference to the drawings, in which like elements in different drawings are numbered identically. The drawings depict selected embodiments (unless otherwise described), and thus are not intended to limit the scope of the invention. It will be understood that embodiments shown in the drawings and described below are merely for illustrative purposes, and are not intended to limit the scope of the invention as defined in the claims.

As described above, adaptors have been designed for multi-tools to facilitate their interfacing (i.e., functioning) with particular designs of punch presses. As further described, the typical reason why the multi-tools would not normally function with the particular press designs is because the presses and multi-tools originate from different manufacturers. In order to appreciate the general design and functioning of known adaptors, elements of a multi-tool are initially described below. However, before proceeding, it is noted that although embodiments described herein make reference to punch presses, the invention is applicable to any type of fabrication equipment or machinery designed to function with multi-tools. Also, while the embodiments are described with regard to downwardly-oriented multi-tools, the invention is also applicable to upwardly-oriented multi-tools. Further, while the tools of the multi-tools described herein are depicted as punches, the embodied adaptor designs should not be limited to only punch-carrying multi-tools.

FIG. 1 illustrates various components of a multi-tool 10 in exploded view. These same components are described herein later with regard to one known adaptor as well an adaptor in accordance with certain embodiments of the invention. The multi-tool components shown include a tool shank 12, a tool selection wheel 14, a tool holder 16, and a stripper plate 18. Regarding the tool selection wheel 14, it is defined to have a central opening into which a segment 14a protrudes from the periphery of the wheel 14. The tool holder 16 includes a plurality of tools 16a (e.g., punches) extending from one planar face thereof. The tools 16a, as illustrated, are spaced about a periphery of the holder 16 so as to correspond to apertures 18a defined about an inner circular base of the stripper plate 18.

Figure 2:
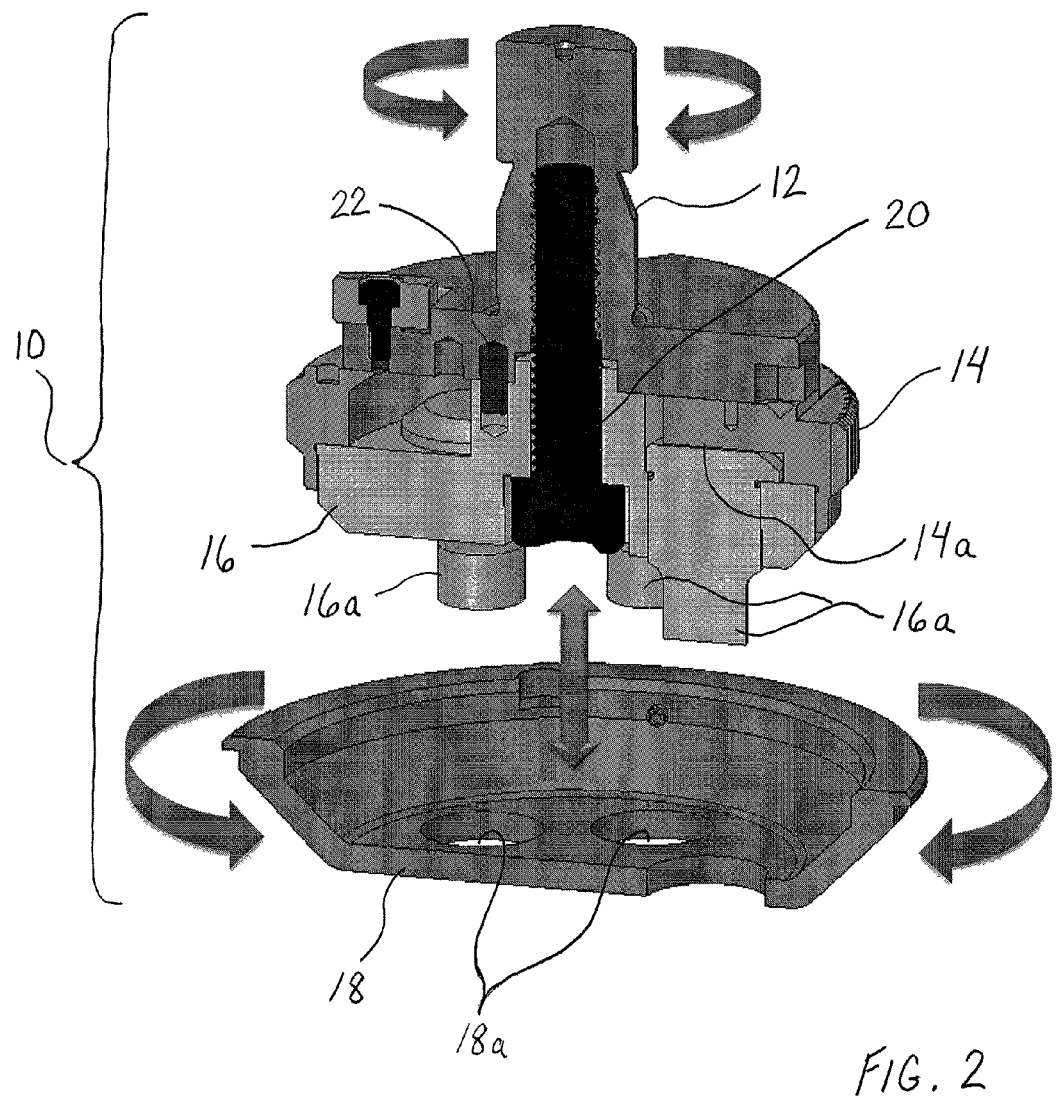
FIG. 2 is a cross-sectional view of the components of FIG. 1 as assembled or situated for collective use as a multi-tool.

FIG. 2 shows a cross-sectional view of the components of the multi-tool 10 as assembled and/or situated for collective use. Particularly, the tool shank 12 is operatively coupled to the tool holder 16, e.g., via a threaded bolt 20, while the shank 12 and holder 16 are prevented from rotating relative to each other, e.g., via a dowel 22 that is lodged there between. The tool selection wheel 14 is held between the tool shank 12 and tool holder 16, such that the wheel 14 is rotatable relative to the shank 12 and holder 16. Although, as will be later detailed below, the tool selection wheel 14 is most often retained from rotating during tool selection processes, while the tool shank 12 and the tool holder 16 (along with its tools 16a) are collectively rotated about the wheel 14. While not shown, hardware (e.g., a secondary ram of the punch press in which the multi-tool is provided) is utilized for operably coupling the stripper plate 18 to the tool holder 16. As a consequence of such coupling, the stripper plate 18 is rotationally locked relative to the holder 16 (such that the plate's apertures 18a align and rotate with corresponding of the holder's tools 16a). However, such coupling further permits the stripper plate 18 to be movable vertically relative to the holder 16 (and its tools 16a) for stripping functionality during the deforming/punching processes of the press.

As alluded to above, and with continued reference to FIGS. 1 and 2, the tools 16a of the multi-tool 10 are collectively rotatable relative to the tool selection wheel 14 (via collective rotation of the tool shank 12 and the tool holder 16). To that end, by initial locking the position of the tool selection wheel 14 (e.g., via external geared key of the punch press; not shown) and subsequently rotating the tool shank 12, the tool holder 16 and its tools 16a correspondingly rotate about the tool selection wheel 14, such that a selected one of the tools 16a can be positioned to underlie the protruding segment 14a of the wheel 14. In turn, when the tool shank 12 is subsequently forced downward (e.g., via ram stroke of the punch press), the selected tool 16a is the only one of the tools 16a that maintains a lowered profile in the holder 16 (via the contact between the one of the tools 16a and the segment 14a). As such, application of force on the tool shank 12 (e.g., via ram of the press) is transmitted from shank 12 through the segment 14a of the tool selection wheel 14, through the selected tool 16a, and then into the material to be deformed or punched. In contrast, upon contacting the material, the other tools 16a move upward, back within the central opening of the tool selection wheel 14.

As described above, adaptors have been created for multi-tools in order for them to be interfaced with particular punch press designs. Known multi-tool adaptors generally involve a plurality of components designed to partially overlay, underlay, and/or surround different portions of the multi-tools. The components from one known multi-tool adaptor 30 are illustrated in exploded form in FIG. 3. As shown, the components include a top retainer ring 32, a tool shank holder 34, an index ring 36, and a stripper plate holder 38. Some distinctive features of these components should be noted. For example, the tool shank holder 34 defines a central channel 34a and includes an external connecting arm 34b that initially protrudes outward and then downward from an outer periphery of the holder 34. In addition, the tool shank holder 34 includes a lever arm 34c that further protrudes outward from the holder's outer periphery. The index ring 36 defines a central opening into which a toothed locking key 36a protrudes. Also regarding the index ring 36, a cavity is defined therein, and is used to accommodate a plurality of spring members 36b aligned along the entire curvature of the ring 36. Further regarding the index ring 36, there are a pair of grooves 36c (only one of which is visible) on its outer periphery. Turning to the stripper plate holder 38, as shown, it is generally shaped in the form of a "C" and at an outer midpoint of such curved shape, a pocket 38a is defined.

Figure 4A:
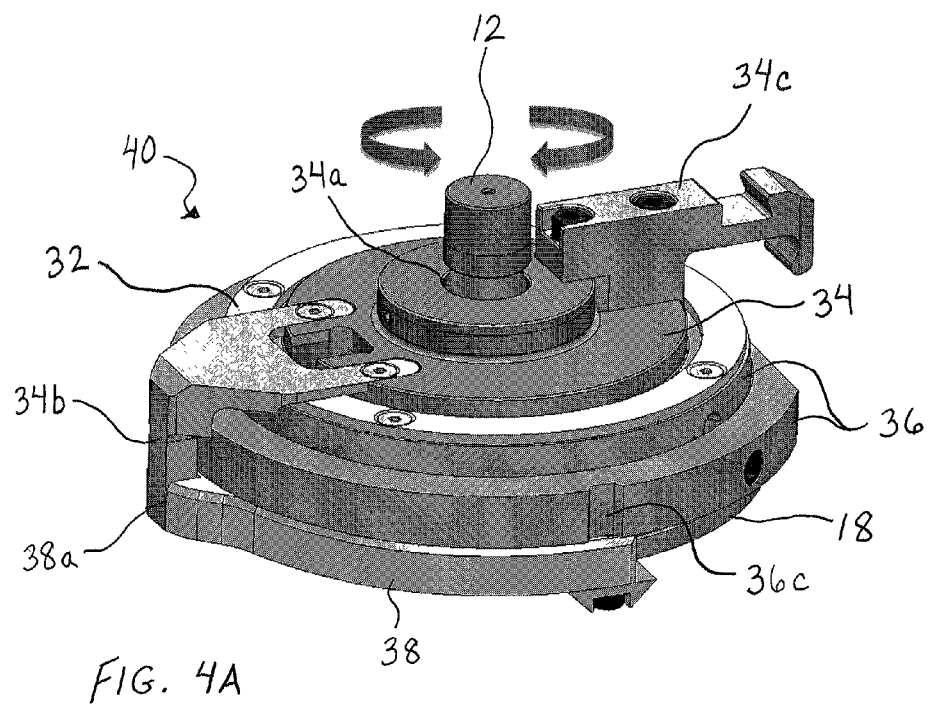
FIG. 4A is a side perspective view of the multi-tool components of FIG. 1 and the adaptor components of FIG. 3 as assembled for use in particular design of punch press.
Figure 5:
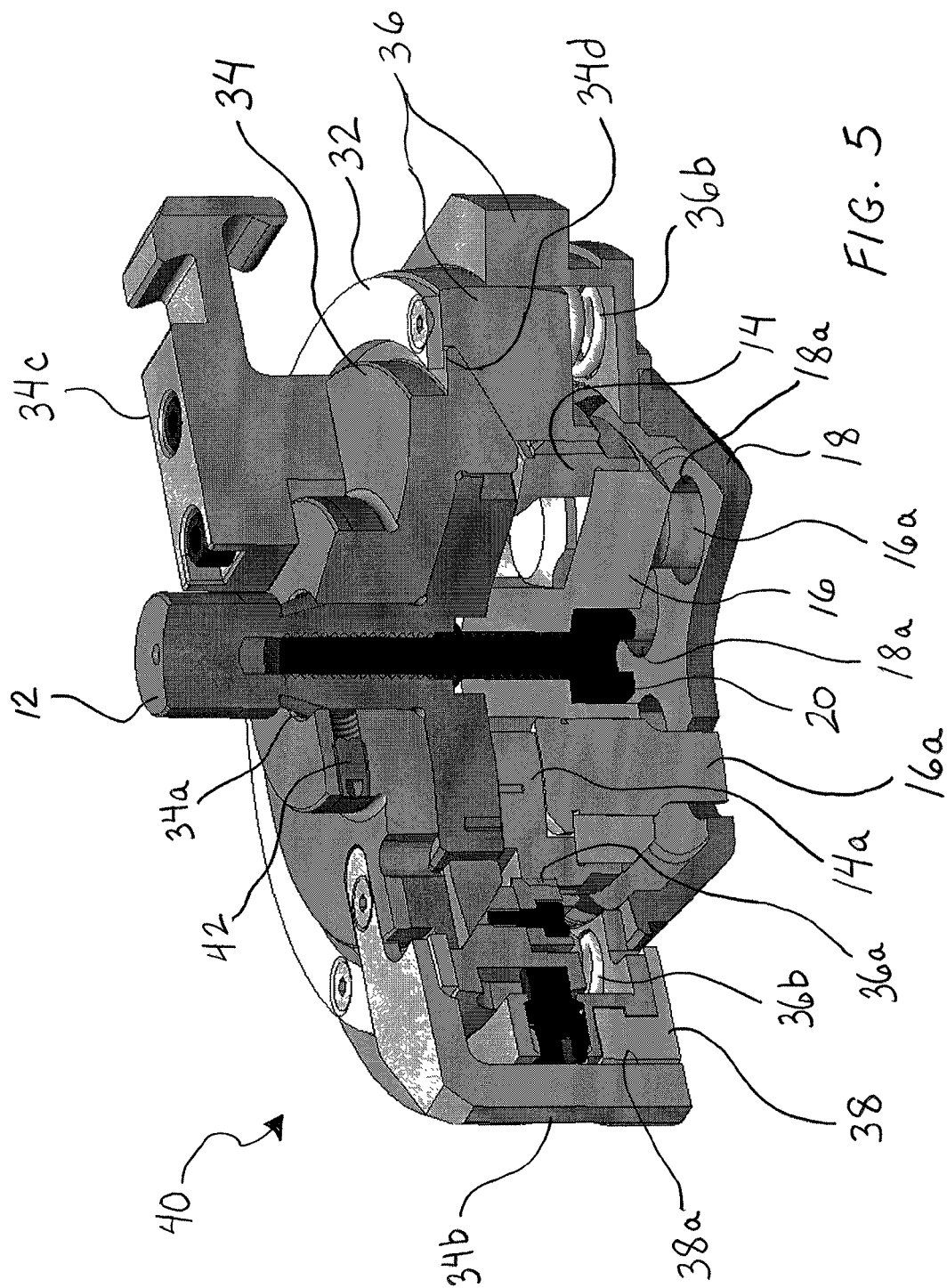
FIG. 5 is a sectional view of the assembly of FIG. 4A.

With reference back to FIGS. 1 and 2, FIG. 4A shows an assembly 40 of the components of the multi-tool 10 with the components of the adaptor 30, while FIG. 5 shows a sectional view of such assembly 40. Starting with FIG. 5, and similar to the multi-tool assembly of FIG. 2, the tool shank 12 of the multi-tool 10 is operatively coupled to the tool holder 16, e.g., via threaded bolt 20, while the shank 12 and holder 16 are prevented from rotating relative to each other, e.g., via a dowel (not shown) lodged there between. To that end, and further similar to the assembly of FIG. 2, the tool selection wheel 14 is held between the shank 12 and holder 16, so as to be rotatable relative to the shank 12 and holder 16.

However, further adding to the assembly of FIG. 2, FIG. 5 illustrates the components of the adaptor 30 incorporated with the multi-tool components. Initially focusing on the upper portion of the assembly 40, the tool shank holder 34 of the adaptor 30 is shown as having been inserted over the tool shank 12 of the multi tool 10. As a result, the tool shank holder 34 rests on a base of the tool shank 12, while the shank portion of the tool shank 12 extends through the central channel 34a of the holder 34. A fastener 42, e.g., set screw, is used to couple the tool shank holder 34 to the tool shank 12 of the multi-tool 10, such that they move (e.g., rotate) in unison. The base of the tool shank holder 34 is shown to extend outward from the base of the tool shank 12, forming a lip 34d about its outer periphery. The lip 34d has an outer diameter greater than the inner diameter of the top retainer ring 32. Thus, the lip 34d can be used as a lower support for the retainer ring 32, such that when an upper surface of the index ring 36 is coupled to the retainer ring 32 via fasteners (as shown), the lip 34d of the tool shank holder 34 serves as a support for both the retainer ring 32 and the index ring 36. To that end, the tool shank holder 34 is confined between the top retainer ring 32 and the index ring 36, although is still able to rotate relative to the rings 32, 36.

With continued reference to FIG. 5, and with focus on the lower portion of the assembly 40 (perhaps best observed from FIG. 4A), the stripper plate 18 of the multi-tool 10 is fastened to opposing ends of the "C" shaped stripper plate holder 38. The pocket 38a defined by the stripper plate holder 38 functions in accepting an end of the external connecting arm 34b (which, as already described, extends from the tool shank holder 34). As such, when either of the coupled-together tool shank 12 or tool shank holder 34 are rotated, there is corresponding rotation of the tool holder 16 and its tools 16 (via threaded bolt coupling the tool shank 12 and tool holder 16) and the stripper plate holder 38 and its stripper plate 18 (via connecting arm 34b coupling the tool shank holder 34 and the stripper plate holder 38). Further, because the connecting arm 34b is free to vertically slide within the pocket 38', the stripper plate holder 38 (and correspondingly, the stripper plate 18 fastened thereto) can vertically move with respect to the tool holder 16 and its tools 16a.

Finally, turning to the middle portion of the assembly 40, as described above and shown in FIG. 5, the index ring 36 is fastened to the top retainer ring 32 and thereby supported by the lip 34d of the tool shank holder 34. In light of this, the index ring 36 is suspended so as to surround the guide wheel 14 of the multi-tool 10. As a consequence, the toothed locking key 36a of the index ring 36 correspondingly engages outer teeth of the tool selection wheel 14 of the multi-tool 10. Given such engagement, the index ring 36 and the tool selection wheel 14 are rotationally locked together.

Figure 4B:
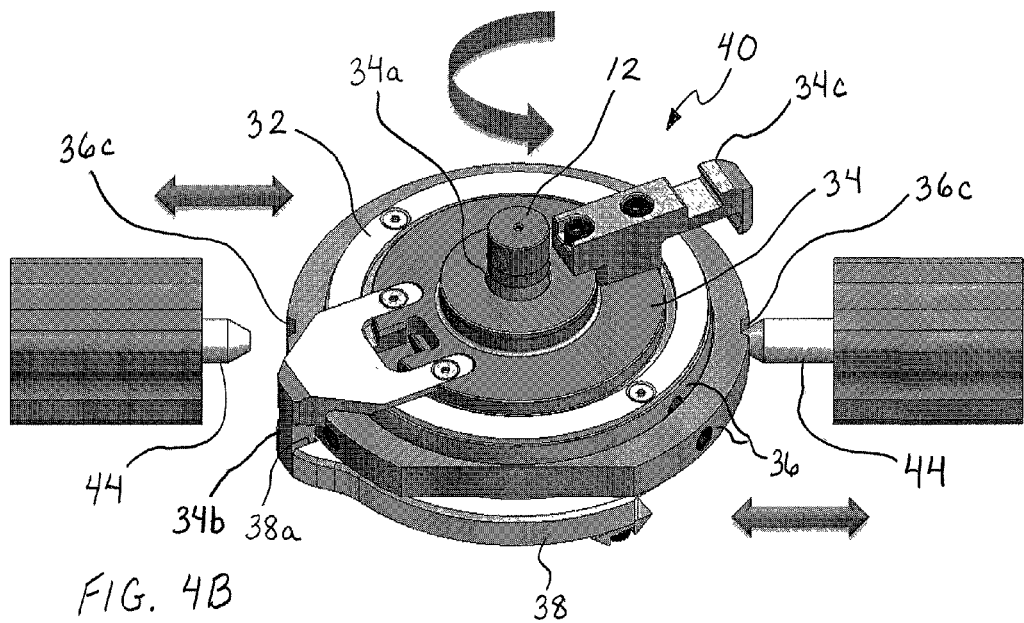
FIG. 4B is a top perspective view of the assembly of FIG. 4A shown as being actuated via mechanisms of punch press.

With reference to FIGS. 4B and 5, and similar to that previously described with reference to FIG. 2, the tools 16a of the multi-tool 10 are collectively rotatable relative to the tool selection wheel 14 (via collective rotation of the tool shank 12 and tool holder 16). To that end, by initial locking the position of the tool selection wheel 14 (e.g., via insertion of linear locking fingers 44 of the punch press within corresponding locking grooves 36c of index ring 36; see FIG. 4B) and subsequent rotation of the tool shank 12 or tool shank holder 34 (via lever arm 34c), the tool holder 16 and its tools 16a correspondingly rotate about the tool selection wheel 14, such that a selected one of the tools 16a can be positioned to underlie the protruding segment 14a of the wheel 14. As described above, via use of the connecting arm 34b, the tools 16a of the tool holder 16 and the corresponding apertures 18a of the stripper plate 18 are made to rotate in unison, and to further correspond to any rotation of the tool shank 12 or tool shank holder 34 (i.e., when selecting a tool 16a of the multi-tool 10 for operations of the press). Following selection of the desired tool 16a, when the tool shank 12 or tool shank holder 34 is subsequently forced downward (e.g., via ram stroke of the punch press), the selected tool 16a is the only one of the tools 16a that maintains a lowered profile in the holder 16 (via contact with the segment 14a). As such, application of force (e.g., via ram of the press) on the tool shank 12 is transmitted from shank 12 through the segment 14a of the tool selection wheel 14, through the selected tool 16a, and into the material to be deformed or punched. In contrast, upon contacting the material, the other tools 16a move upward, back within the central opening of the tool selection wheel 14. Further, upon release of the ram force on the tool shank 12 or tool shank holder 34, the selected tool 16a is pulled back from the material, while the stripper plate 18 continues to be pushed forward (via internal spring members 36b of the index ring 36). In such case, as the selected tool 16a pulls back through the corresponding aperture 18a in the stripper plate 18, if any of the deformed/punched material remains connected to the tool 16a, such material separates from the tool 16a upon hitting the stripper plate 18.

It should be understood that the assembly 40 of FIG. 4A (integrating the components of the adaptor 30 with the components of the multi-tool 10) has been effectively used in interfacing with the punch presses for it was intended. As described above, two components that particularly aid with such interfacing are the tool shank holder 34 (by way of its external connecting arm 34b) and the index ring 36 (by way of its locking key 36a). However, these same two components in certain scenarios can be limiting to the performance of the multi-tool as well as the performance of the press with which the multi-tool interfaces.

For example, with reference to FIG. 4B, following an initial locking of the tool selection wheel's position 14 (e.g., via insertion of linear locking fingers 44 of the punch press within corresponding locking grooves 36c of index ring 36) and during subsequent rotation of the tool shank 12, the external connecting arm 34b correspondingly rotates about the index ring 36. However, the locking fingers 44 block the rotation path of the arm 34b. Thus, as the connecting arm 34b nears either of the locking fingers 44, the finger 44 has to be moved away and out of locking engagement with the index ring 36. While it should be appreciated that the locking finger 44 on the opposite side of the index ring 36 can remain extended and engaged with the ring 36, it would be ideal to have both fingers 44 continuously engaged with the index ring 36 during such locking periods. This would prevent any potential shifting of the ring 36 and corresponding misalignment of the finger 44 during its reinsertion within the groove 36c.

Further, with reference to FIGS. 3 and 5, and as described above, the index ring 36 provides a plurality of functions, not only in interfacing with the punch press so as to lock the multi-tool tool selection wheel 14 via the locking key 36a, but also in stripping function of the multi-tool 10 via the spring members 36b that the ring 36 retains. Such diverse functioning required of the index ring 36 not only increases the complexity of the ring's design, but also increases its risk of failure. To that end, if the spring members 36b of the ring 36 were to fail, change-out of the index ring 36 would be necessitated, which would dictate the entire assembly 40 being disassembled to gain access to the ring 36. Although, even if early failure was not considered a potential issue with the spring members 36, there is a further inherent issue with the design. Particularly, over the life of the multi-tool 10, the spring members 36b may function as intended (i.e., to force the stripper plate 18 to extend outward away from assembly 40, so as to aid in stripping processed material from a withdrawn tool 16). However, because the spring members 36b are confined within the index ring 36, their size is ultimately limited. This limitation on spring size correspondingly limits the stripping force of the assembly 40. Conversely, if the spring members 36b were located external to the assembly 40, e.g., above the tool shank holder 34, not only would the index ring 36 have less potential of failure, but a greater stripping force for the multi-tool 10 could be provided, if needed.

Figure 6:
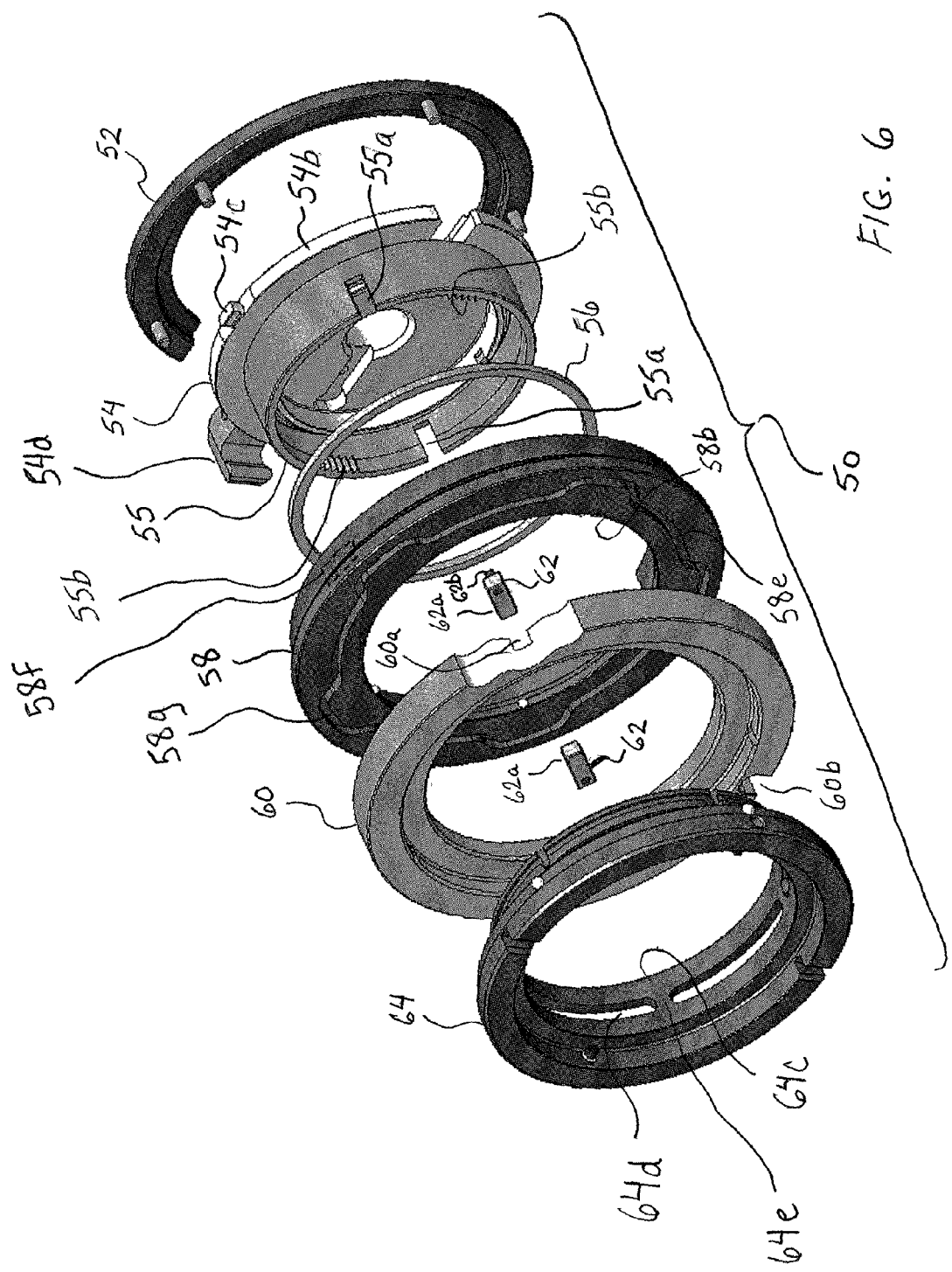
FIG. 6 is an exploded view of components of further adaptor for the multi-tool assembly of FIG. 2, in accordance with certain embodiments of the invention.

FIG. 6 illustrates an exploded view of components of a further multi-tool adaptor 50 for use with multi-tool 10, in accordance with certain embodiments of the invention. As shown, the components include a top retainer ring 52, a tool shank holder 54, further retaining ring 56, guide ring 58, index ring 60, a plurality of cam keys 62, and a stripper plate holder 64. As should be appreciated, many of these components bear same reference names as components previously-described for the known adaptor 30. This is not done to confuse, but instead to highlight the differences in construction and function of these components of same name as used with the adaptor 50.

For example, the tool shank holder 54 is operably joined with a locking ring 55, yet the holder 54 is still free to rotate relative to the ring 55. As further detailed herein, the locking ring 55 is operably joined to index ring 60 via the cam keys 62. To that end, while the index ring 60 is configured to be selectively engaged with a locking finger 44 of the punch press (see FIG. 7B) so as to lock the index ring's rotational position, the task of correspondingly locking the position of the tool selection wheel 14 is translated to the locking ring 55. In certain embodiments, this translation of locking function is provided via the cam keys 62 operably joining the index ring 60 to the locking ring 55.

Defined within the locking ring 55 are vertical key slots 55a within which the cam keys 62 extend. In certain embodiments, the slots 55a have a height at least twice the height of the key portions 62a of the cam keys 62. Due to this difference in height, the key portions 62a are enabled to slide (i.e., rise or descend) within the slots 55a, and such vertical movement of the key portions 62a signals punching action, as will be later described herein. However, at this point, what should be understood is the key portions 62a sliding (i.e., rising or descending) in the slots 55a is similar to the external connecting arm 34b sliding (i.e., rising or descending) within the pocket 38a defined in the stripper plate holder 38 of assembly 40 (involving the known adaptor 30). To that end, such flexibility in vertical movement has been transitioned internal to the adaptor 50 when assembled to the multi tool 10, as opposed to being external via the assembly 40 (involving the known adaptor 30 assembled to the multi-tool 10)

Figure 7A:
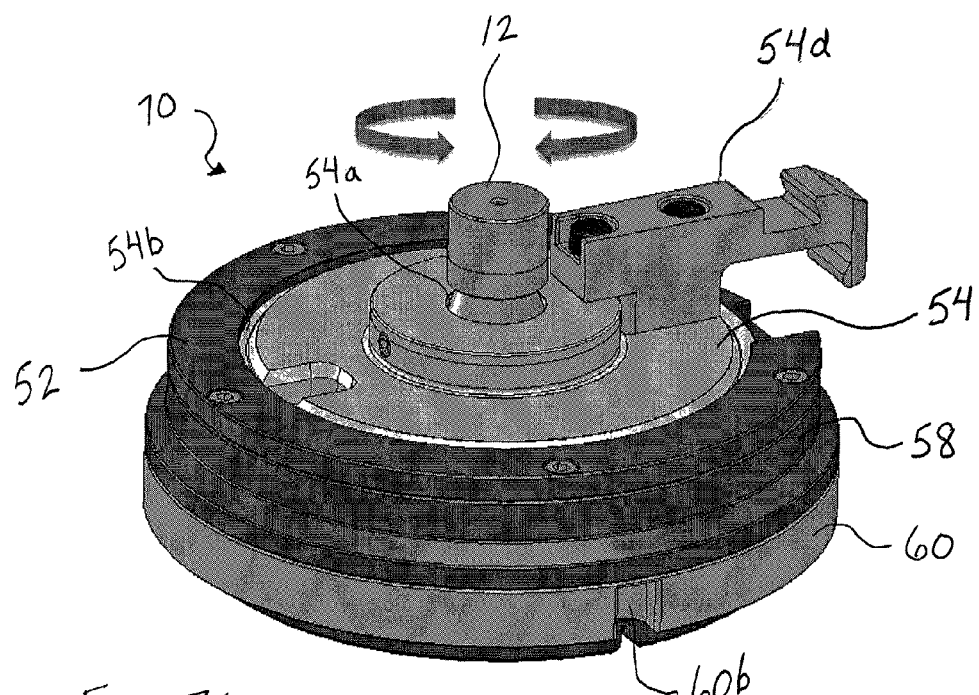
FIG. 7A is a side perspective view of the multi-tool components of FIG. 1 and the adaptor components of FIG. 6 as assembled for use in particular design of punch press, in accordance with certain embodiments of the invention.
Figure 8:
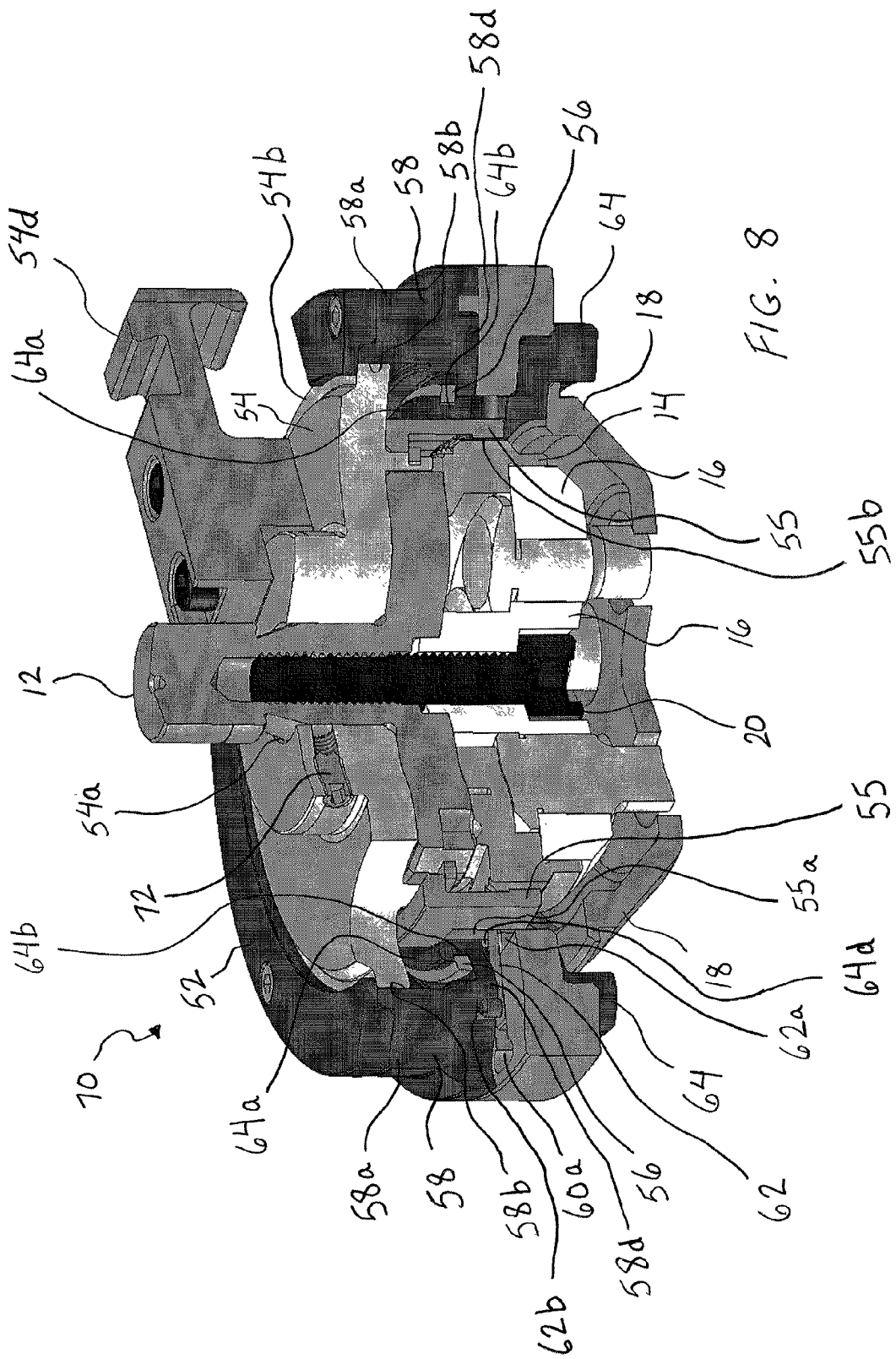
FIG. 8 is a cross-sectional view of the assembly of FIG. 7A.

With reference back to FIGS. 1 and 2, FIG. 7A shows an assembly 70 of the components of the multi-tool 10 with the components of the adaptor 50, while FIG. 8 shows a cross-sectional view of such assembly 70. Starting with FIG. 8, and similar to the multi-tool assembly of FIG. 2, the tool shank 12 of the multi-tool 10 is operatively coupled to the tool holder 16, e.g., via threaded bolt 20, while the shank 12 and holder 16 are prevented from rotating relative to each other, e.g., via a dowel (not shown) lodged there between. To that end, and further similar to the assembly of FIG. 2, the tool selection wheel 14 is held between the shank 12 and holder 16, so as to be rotatable relative to the shank 12 and holder 16.

However, further adding to the assembly of FIG. 2, FIG. 8 illustrates the components of the adaptor 50 incorporated with the multi-tool components. Initially focusing on the upper portion of the assembly 70, the assembly has some likenesses to the assembly 40 involving the known adaptor 30. Particularly, the tool shank holder 54 of the adaptor 50 is received by the tool shank 12 of the multi tool 10, such that the holder 54 comes to rest on a base of the tool shank 12, while the shank portion of the tool shank 12 extends through a central channel 54a of the holder 54. A fastener 72, e.g., set screw or the like, is used to couple the tool shank holder 54 to the tool shank 12 of the multi-tool 10, such that both move (e.g., rotate) in unison. Again, similar to the assembly 40, upon being received by the tool shank 12, the bottom of the tool shank holder 54 extends outward from the base of the tool shank 12, forming a lip 54b about its outer periphery. As shown, the lip 54b has an outer diameter greater than the inner diameter of the top retainer ring 52. Thus, the lip 54b can be used as a lower support for the retainer ring 52, as well as further structure to which ring 52 is operably coupled. To that end, and in contrast to the assembly 40 (and known adaptor 30), the retainer ring 52 is operably coupled (e.g., via fasteners) to an upper end 58a of the guide ring 58. The guide ring 58 is also coupled to tool shank holder 54, but only rotationally. In certain embodiments, as shown, this coupling between the guide ring 58 and the holder 54 is via recesses 58f (hidden; see FIG. 6) defined in inner wall 58b of its upper end 58a which receive corresponding tabs 54c (see FIG. 6) extending outward from the lip 54b of the tool shank holder 54. Again, this joining between tabs 54c of the tool shank holder 54 and the recesses of the guide ring 58 rotatably lock the holder 54 and the guide ring 58, yet the holder 54 is free to move vertically relative to the guide ring 58. Thus, at this point, via the above-described connections, the guide ring 58 of the adaptor 50 is rigidly coupled to the top retainer ring 52 and only rotationally locked to the tool shank holder 54, while the tool shank holder 54 is rigidly coupled to the tool shank 12 of the multi-tool 10.

With continued reference to FIG. 8, and with focus on the lower portion of the assembly 70, the stripper plate 18 of the multi-tool 10 is operably coupled to the stripper plate holder 64. An upper end 64a of the stripper plate holder 64 is operably coupled to a lower end 58d of the guide ring 58. In certain embodiments, the coupling between the guide ring 58 and the stripper plate holder 64 is via a retaining ring 56 within continuous recess 64b defined about an outer periphery of the stripper plate holder 64. As such, when the tool shank 12 and tool shank holder 54 are rotated (as both are coupled together), there is corresponding rotation of the tool holder 16 and its tools 16 (via threaded bolt coupling the tool shank 12 and tool holder 16) as well as the guide ring 58 (via tabs 54c of the holder 54 rotationally coupled within recesses of guide ring 58) and top retainer ring 52 and the stripper plate holder 64 (and its stripper plate 18) rigidly coupled to the guide ring 58

Finally, turning to the middle portion of the assembly 70, as described above and shown in FIG. 8, the index ring 60 is joined to the locking ring 55 via the cam keys 62. The cam keys 62 are held within corresponding recesses 60a of the index ring 60. As described above, the key portions 62a of the cam keys 62 extend into the key slots 55a of the locking ring 55. As should be appreciated, extension of the cam keys 62 into the slots 55a results in rotational locking of the index ring 60 with the locking ring 55; however, the slots 55a enable the locking ring 55 and the tool selection wheel 14 of the multi-tool 10 to move vertically relative to the index ring 60. This will be further detailed later.

Figure 7B:
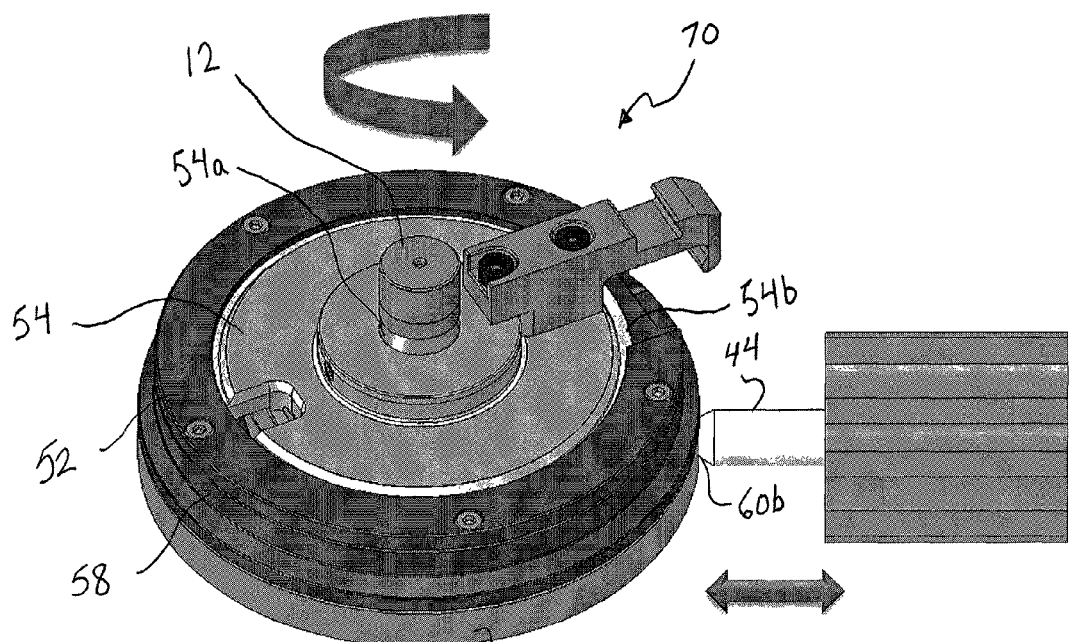
FIG. 7B is a top perspective view of the assembly of FIG. 7A shown as being actuated via mechanisms of punch press, in accordance with certain embodiments of the invention.

However, getting back to the rotational locking of the index ring 60 and the locking ring 55, upon the index ring 60 being locked rotationally (e.g., via insertion of locking finger 44 of punch press in groove 60b of index ring 60; see FIG. 7B) the locking ring 55 is correspondingly locked rotationally via cam keys 62 in key slots 55a of locking ring 55. As a consequence, inner teeth 55b of locking ring 55, via engagement with outer teeth of the tool selection wheel 14 of the multi-tool 10, rotationally locks wheel 14. In summary, upon insertion of locking finger 44 of press in groove 60b of index ring 60, the index ring 60, the locking ring 55, and the tool selection wheel 14 are rotationally locked. As previously described, such rotational locking is a result of the index ring 60 and the locking ring 55 being joined via cam keys 62. However, as previously described, due to this joining being provided internal to the assembly 70, there is some interference with the side wall 64c of the stripper plate holder 64. Particularly, with reference to FIG. 8, such side wall 64c extends radially between the index ring 60 and the locking ring 55. As such, to accommodate extension of the cam keys 62 from index ring 60 to locking ring 55, a channel or web 64d is defined in the stripper plate holder side wall 64c through which the key portions 62a of the cam keys 62 extend. However, the web 64d would need to be divided so as to establish some continuity with the further extent of the holder 64 (the dividers 64e being shown in FIG. 6).

Continuing with the above, when the tool shank holder 54 is rotated, whereby the stripper plate holder 64 correspondingly rotates relative to the index ring 60, the cam keys 62 would correspondingly travel within the web 64d of the stripper plate holder 64. However, the cam keys 62 would be blocked from their path of travel each time they encountered a web divider 64e. Accordingly, the travel path about the assembly 70 is dictated by a cam pathway 58e defined in the underside of the guide ring 58. The cam portions 62b of the cam keys 62 are inserted in such cam pathway 58e. Thus, upon the index ring 60 being rotated relative to the guide ring 58 (or vice versa), the cam portions 62b would correspondingly travel (or be steered) within the pathway 58e. As exemplified by the guide ring 58 shown in FIG. 6, the pathway 58e steers (the cam keys 62) outward (into outer paths 58g) upon every instance the key portions 62a would encounter a web divider 64e. However, it should be appreciated that for each such occurrence of steering outward by the cam key 62 (to avoid stripper plate holder web divider 64e), that cam key 62 would correspondingly be pulled out of the key slot 55a of the locking ring 55. As such, an odd number of divisions is requisite for the web 64d in comparison to the quantity of cam keys 62 to ensure that there is always a cam key 62 extending within one of the slots 55a of the locking ring 55 at all times.

With reference to FIGS. 7B and 8, and similar to that previously described with reference to FIG. 2, the tools 16a of the multi-tool 10 are collectively rotatable relative to the tool selection wheel 14 (via collective rotation of the tool shank 12 and the tool holder 16). To that end, the position of the tool selection wheel 14 is initially locked (e.g., via insertion of linear locking finger 44 of the punch press within locking groove 60b of index ring 60, which correspondingly locks position of cam keys 62 with respect to locking ring 55, which correspondingly locks position of tool selection wheel 14 via locking teeth 55b). Subsequently, the tool shank 12 or tool shank holder 54 (via lever arm 54d) are rotated, which causes the tool holder 16 and its tools 16a to correspondingly rotate about the tool selection wheel 14, such that a selected one of the tools 16a can be positioned to underlie the protruding segment 14a of the wheel 14. As described above, due to the tool shank holder 54 being rotationally coupled to the stripper plate holder 64 (via the guide ring 58), the tools 16a of the tool holder 16 and the corresponding apertures 18a of the stripper plate 18 are made to rotate in unison, and to further correspond to any rotation of the tool shank 12 or tool shank holder 34 (i.e., when selecting a tool 16a of the multi-tool 10 for operations of the press).

Figure 9:
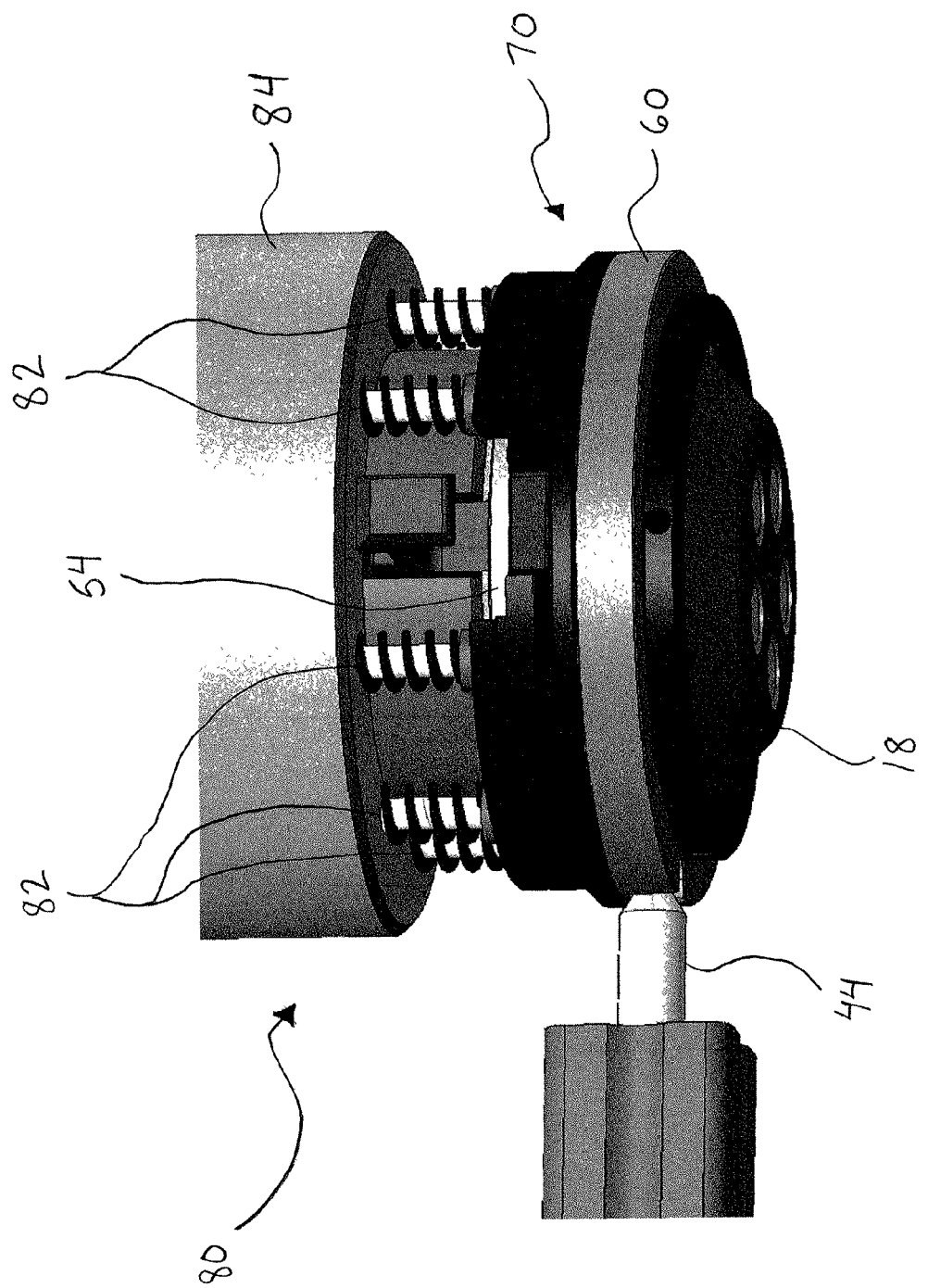
FIG. 9 is a side perspective view of the assembly of FIG. 7A as situated in punch press in accordance with certain embodiments of the invention.

With reference to FIG. 9, illustrating assembly 70 situated in punch press 80, springs 82 (e.g., spring loaded pins) can be located external to the assembly 70, and in preferable embodiments, underlying the press ram 84, as shown. To that end, following selection of the desired tool 16a from the assembly 70 (as described above), when the ram 84 (e.g., shown as rigidly connected to, and thereby hiding from view, the tool shank 12) is subsequently forced downward, the stripper plate 18 comes into contact with the workpiece (not shown) and pressure is applied through the stripper plate 18 via the springs 82. The press ram 84 continues downwards until the selected tool 16a penetrates the workpiece to produce a bend or hole. It should be appreciated that this penetration occurs via the vertical movement of the punch holder 16, locking ring 55, and tool selection wheel 14, collectively, and particularly, relative to the index ring 60 (i.e., correspondingly enabled via sliding of the cam keys 62 upward in the key slots 55a of the locking ring 55). However, it should be noted that the cam keys 62 are not moving, but instead the key slots 55a are moving about the cam keys 62, with the downward movement of the locking ring 55. Subsequently, as the ram 84 moves upwards after such bending or punching operation, the pressure on the stripper plate 18 is maintained by springs 82 until the selected tool 16a has withdrawn from the work piece via contact with the plate 18.

Figure 10:
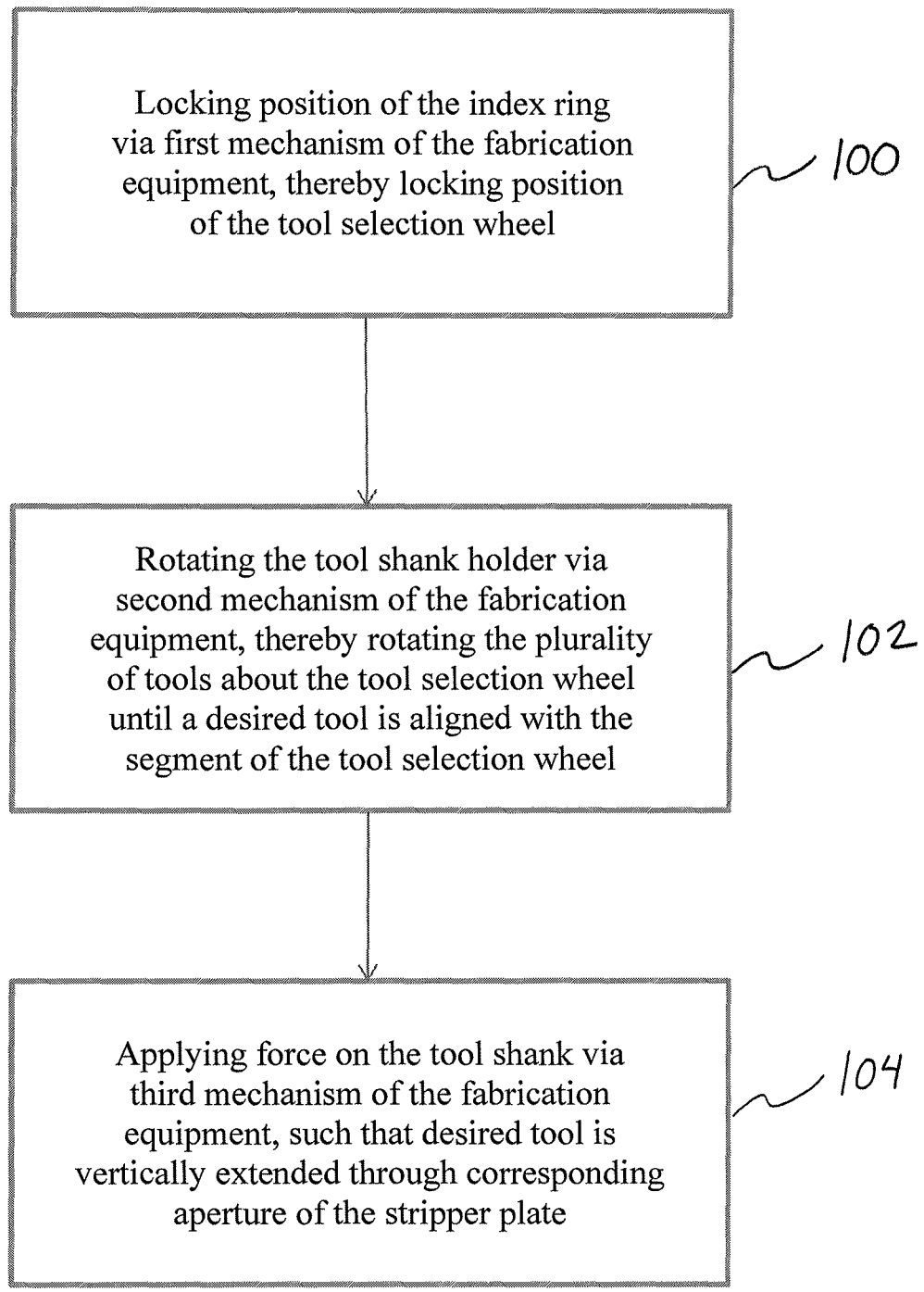
FIG. 10 is a flowchart listing general steps with regard to an operation exemplified in FIG. 9 in accordance with certain embodiments of the invention.

In continuing with the above, FIG. 10 shows a flowchart listing general steps with regard to an operation as depicted in FIG. 9 with the assembly 70 (involving new adaptor 50) in accordance with certain embodiments of the invention. The multi-tool 10 with new adaptor 60 are again described. For brevity sake, all components are not again described. To that same end, some features are described are newly mentioned. To that end, while the following summary provides somewhat truncated combinations of features that should be understood as additional embodiments of the invention, they should be viewed as limiting the embodiments already described.

With reference back to FIGS. 1, 2, 7, and 8, the multi-tool includes a tool shank 12, a tool selection wheel 14, a tool holder 16 including a plurality of tools 16a, and a stripper plate 18 defined with a plurality of apertures 18a corresponding to a quantity of tool-receipt areas 16b of the tool holder 16. The tool shank 12 is operably coupled to the tool holder 16, and the tool selection wheel 14 is held between the tool shank 12 and the tool holder 16. The tool selection wheel 14 has a central opening 14b into which a segment 14a protrudes from a periphery of the wheel 14. The adaptor 50 includes a tool shank holder 54, a locking ring 55, an index ring 60, and a stripper plate holder 64.

The tool shank holder 54 is operably coupled to the tool shank 12 and the locking ring 55, yet the locking ring 55 is rotatable relative to the tool shank holder 54. The locking ring 55 extends from the tool shank holder 54 and is engaged with the tool selection wheel 14 such that the wheel is rotationally coupled to the locking ring 55. The locking ring 55 further defines a plurality of slots 55a therein. The index ring 60 is operably joined to the locking ring 55 via a plurality of cam keys 62. The cam keys 62 are rigidly held to the index ring 60 and extend inward from a periphery of the index ring 60 so as to correspondingly align with the slots 55a of the locking ring 55. At least one of the cam keys 62 is inserted within one of the slots 55a of the locking ring 55 at all times so as to rotationally couple the locking ring 55 to the index ring 60, while the tool shank holder 54 and locking ring 55 are free to move vertically relative to the index ring 60. The stripper plate holder 64 is operably coupled to the tool shank holder 54, and is oriented to align the apertures 18a of the stripper plate 18 with the quantity of tool-receipt areas 16b of the tool holder 16.

In view of the above, the flowchart of FIG. 10 begins with step 100 of locking position of the index ring 60 via first mechanism (e.g., locking fingers 44) of the fabrication equipment (e.g., the punch press 80), thereby locking position of the tool selection wheel 14. A subsequent step 102 involves rotating the tool shank holder 54 via second mechanism (e.g., an complementary extension of press ram 84) of the fabrication equipment, thereby rotating the plurality of tools 16a about the tool selection wheel 14 until a desired tool 16a is aligned with the segment 14a of the tool selection wheel 14. A later step 104 involves applying force on the tool shank 12 via third mechanism (e.g., press ram 84) of the fabrication equipment, such that desired tool 16a is vertically extended through corresponding aperture 18a of the stripper plate 18. An important consideration, further described below, is that the assembly 70 provides operable coupling of the stripper plate 18 and the tool shank holder 54 internal to the multi-tool 10. As such, there is no potential of possible collision between a external connecting arm (such as with the known adaptor 30) and locking finger 44 of the press. Thus, the tool shank holder 54 and stripper plate holder 64 can be move entirely around (by at least 360 degrees) the assembly while the position of the locking arm 44 with respect to the assembly 70 (multi-tool 10 and adaptor 50) is maintained.

Continuing with the above, and with reference back to FIG. 7B, in using the assembly 70 (with new adaptor 50) as opposed to using the assembly 40 (with known adaptor 30), the locking finger 44 of the press no longer needs to be removed from the assembly 70 during the tool selection process. As such, the configuration of the new adaptor 50 permits use of an automated recovery program with the multi tool 10, while such program could not be run with the old, known adaptor 30. Particularly, the press locking fingers 44 are programmed to move at certain angles, wherein these angles are output in the press ram (e.g., via rotary encoder) relative to the angular position of the adaptor, which is a known quantity once the adaptor is loaded in the press ram. However, for the assembly 40 (with known adaptor 30), once a light guard is broken or a power cut has occurred, although the press knows what angle the ram is at, it has no idea where the external connecting arm 34b is as the information to where the multi-tool was (prior to the light guard break or power cut) is lost. Thus, this is why the locking fingers 44 cannot be used to recover the position if using the old adaptor 30, as the relation to the index ring 60 and the locking fingers 44 is lost, and damage could result to the press and adaptor 30 if it were estimated. However, as the new adaptor 50 has no external connecting arm, the machine locking finger 44 is free to safely engage in the index groove 60b to recover its position. To that end, in certain embodiments, when the adaptor 50 is utilized with the multi-tool 10, the locking fingers 44 from the press can serve dual functions if position sensor (e.g., linear encoder) is incorporated in the design, in terms of locking the position of index ring 60 and further using spatial information (i.e., with respect to various components of the assembly 70) so as to accordingly drive the fabrication machine (e.g., indentifying spatial information of groove 60b which can then be used in determining requisite amount of rotation of the tool shank 12 or tool shank holder 54), which facilitates better efficiency with regard to further functioning of the press, but also allows the information to be easily recalled or reassessed in the event of power loss.

While preferred embodiments of the present invention have been described, it is to be understood that numerous changes, adaptations, and modifications can be made to the preferred embodiments without departing from the spirit of the invention and the scope of the claims. Thus, the invention has been described in connection with specific embodiments for purposes of illustration. The scope of the invention is described in the claims, which are set forth below.

What is claimed is:

1. An adaptor for a multi-tool comprising:
   a tool shank holder configured to be operably coupled to a tool shank of a multi-tool;
   a locking ring configured to engage a tool selection wheel of the multi-tool, the locking ring configured to be operably coupled yet rotatable relative to the tool shank holder, whereby the locking ring extends from the tool shank holder and is defined with a plurality of slots; and
   an index ring configured to be operably joined to the locking ring via a plurality of cam keys, the cam keys being rigidly held to the index ring and extending inward from a periphery of the index ring so as to correspondingly align with the slots of the locking ring;
   wherein when at least one of the cam keys is inserted within one of the slots of the locking ring, the locking ring is rotationally coupled to the index ring, while the tool shank holder and locking ring are free to move vertically relative to the index ring.

2. The adaptor of claim 1 further comprising a stripper plate holder configured to hold a stripper plate of the multi-tool, the stripper plate holder configured to be operably coupled to the tool shank holder, whereby a side wall of the stripper plate holder is radially positioned between the locking ring and the index ring, the stripper plate holder side wall defined with a web through which the cam keys are configured to extend between the index ring and the locking ring.

3. The adaptor of claim 2 further comprising a guide ring configured to operably couple the stripper plate holder to the tool shank holder, whereby the index ring is situated between the guide ring and the stripper plate holder, the guide ring defining a cam pathway therein and within which cam portions of the cam keys travel so as to steer the cam keys during rotation of the guide ring relative to the index ring.

4. The adaptor of claim 3 wherein the web of the stripper plate holder is comprised of a plurality of webs separated by dividers, the cam pathway being defined with a plurality of outer paths corresponding to each of the dividers such that travel of the cam portions with respect to the outer paths of the cam pathway results in the cam keys being steered outward from the slots of the locking ring and the webs of the stripper plate holder so as to avoid collision of the cam keys with the dividers.

5. A multi-tool with adaptor, comprising:
   a multi-tool that comprises a tool shank, a tool selection wheel, and a tool holder including a plurality of tools, the tool shank is operably coupled to the tool holder, and the tool selection wheel is held between the tool shank and the tool holder, wherein the tool selection wheel has a central opening into which a segment protrudes from a periphery of the wheel; and
   an adaptor that comprises a tool shank holder, a locking ring, and an index ring;
   wherein the tool shank holder is operably coupled to the tool shank and the locking ring, yet the locking ring is rotatable relative to the tool shank holder, the locking ring extending from the tool shank holder and engaged with the tool selection wheel such that the wheel is rotationally coupled to the locking ring, the locking ring further defining a plurality of slots therein; and
   wherein the index ring is operably joined to the locking ring via a plurality of cam keys, the cam keys being rigidly held to the index ring and extending inward from a periphery of the index ring so as to correspondingly align with the slots of the locking ring, whereby at least one of the cam keys is inserted within one of the slots of the locking ring at all times so as to rotationally couple the locking ring to the index ring, while the tool shank holder and locking ring are free to move vertically relative to the index ring.

6. The multi-tool of claim 5, wherein the tool holder is a punch holder, and wherein the plurality of tools is a plurality of punches.

7. The multi-tool of claim 5, wherein the locking ring is defined with teeth on an inner side, which is engaged with teeth on an outer periphery of the tool selection wheel.

8. The multi-tool of claim 5, when rotational position of the tool selection wheel is locked via locking of rotational position of the index ring, such that subsequent rotation of the tool shank holder results in corresponding rotation of the tool holder and the tools about the wheel whereby a desired one of the tools can be rotated relative to the protruding segment of the wheel.

9. The multi tool of claim 5, further comprising a stripper plate of the multi-tool, the stripper plate defined with a plurality of apertures corresponding to a quantity of tool-receipt areas of the tool holder, wherein the stripper plate is held by a stripper plate holder of the adaptor, wherein the stripper plate holder is operably coupled to the tool shank holder.

10. The multi-tool of claim 9, wherein the stripper plate holder is oriented to align the apertures of the stripper plate with the quantity of tool-receipt areas of the tool holder, wherein the rotation of the tool holder and the plurality of tools results in corresponding rotation of the stripper plate holder such that the apertures of the stripper plate remain aligned with the tool-receipt areas of the tool holder.

11. The multi-tool of claim 9 further comprising a guide ring of the adaptor that operably couples the stripper plate holder to the tool shank holder, whereby the index ring is situated between the guide ring and the stripper plate holder, the guide ring defining a cam pathway therein and within which cam portions of the cam keys travel so as to steer the cam keys during rotation of the guide ring relative to the index ring.

12. The multi-tool of claim 11, wherein a side wall of the stripper plate holder is radially positioned between the locking ring and the index ring, wherein the stripper plate holder side wall is defined with a web through which the cam keys are configured to extend between the index ring and the locking ring.

13. The multi-tool of claim 12 wherein the stripper plate holder is comprised of a plurality of webs separated by dividers, the cam pathway being defined with a plurality of outer paths corresponding to each of the dividers such that travel of the cam portions with respect to the outer paths of the cam pathway results in the cam keys being steered outward from the slots of the locking ring and the webs of the stripper plate holder so as to avoid collision of the cam keys with the dividers.

14. A method of using the multi-tool with adaptor of claim 9 with fabrication equipment, the method comprising the steps of:
   locking position of the index ring via first mechanism of the fabrication equipment, thereby locking position of the tool selection wheel;
   rotating the tool shank holder via second mechanism of the fabrication equipment, thereby rotating the plurality of tools about the tool selection wheel until a desired tool is aligned with the segment of the tool selection wheel, wherein the operable coupling of the stripper plate and the tool shank holder being provided internal to the multi-tool enables the rotation of the tool shank holder to be at least 360 degrees while positioning of the first mechanism can be maintained with respect to the multi-tool; and applying force on the tool shank via third mechanism of the fabrication equipment, such that desired tool is vertically extended through corresponding aperture of the stripper plate and performs an operation on a workpiece.

15. The method of claim 14 wherein the fabrication equipment is a punch press, the third mechanism is a ram, wherein applying the force on the tool shank comprises striking the tool shank via vertical stroke of ram onto the tool shank.

16. The method of claim 15 further comprising a step of locating a plurality of springs external to the multi-tool with adaptor so as to exert pressure through the multi-tool to the stripper plate.

17. The method of claim 16, wherein the springs are located between the ram of the press and an end of the multi-tool opposing the stripper plate, the springs located at the periphery of the multi-tool, such that pressure is maintained on the stripper plate until the ram withdraws from the vertical stroke and the desired tool completes its withdrawal back through the stripper plate.

18. The method of claim 16, wherein the springs are spring loaded pins.

19. The method of claim 14 wherein the locking arm further comprises a sensor, wherein the method further comprises a step of the sensor providing spatial data regarding the multi-tool to the fabrication equipment so as to guide the second mechanism regarding amount of rotation requisite for the tool shank holder.

20. The method of claim 19 wherein the sensor comprises a linear encoder, wherein the spatial data is capable of being recalled by the sensor in event of power loss to the fabrication equipment.

* * * * *